SWITCHING SYSTEM USING ADDITIONAL SELECTORS IN SOME PATHS

Filed March 27, 1967 13 Sheets-Sheet 1

INVENTORS
DAVID MARTIN LEAKEY
RICHARD FRANCIS BENTINCK SPEED
BY Kemon, Palmer & Estabrook
ATTORNEYS INVENTORS
David Martin Leakey
Richard Francis Bentinck Speed
BY Kemon, Palmer & Estabrook
ATTORNEYS Jan. 13, 1970 D. M. LEAKEY ET AL 3,489,858

SWITCHING SYSTEM USING ADDITIONAL SELECTORS IN SOME PATHS

Filed March 27, 1967 13 Sheets-Sheet 3

INVENTORS
DAVID MARTIN LEAKEY
RICHARD FRANCIS BENTINCK SPEED
BY Kinchelon, Kinchelon & Oltger
ATTORNEYS

SWITCHING SYSTEM USING ADDITIONAL SELECTORS IN SOME PATHS

INVENTORS
DAVID MARTIN LEAKEY
RICHARD FRANCIS BENTINCK SPEED
BY Kinderten, Kinderten & Ottiger
ATTORNEYS

SWITCHING SYSTEM USING ADDITIONAL SELECTORS IN SOME PATHS

Filed March 27, 1967 13 Sheets-Sheet 5

INVENTORS
DAVID MARTIN LEAKEY
RICHARD FRANCIS BENTINCK SPEED
BY Kimbleton, Kimbleton & Ottery
ATTORNEYS Jan. 13, 1970 D. M. LEAKEY ET AL 3,489,858

SWITCHING SYSTEM USING ADDITIONAL SELECTORS IN SOME PATHS

Filed March 27, 1967 13 Sheets-Sheet 6

INVENTORS
DAVID MARTIN LEAKEY
RICHARD FRANCIS BENTINCK SPEED
BY Kemon, Palmer & Estabrook [illegible] Attys
ATTORNEYS INVENTORS
DAVID MARTIN LEAKEY
RICHARD FRANCIS BENTINCK SPEED
BY [signature]
ATTORNEYS

SWITCHING SYSTEM USING ADDITIONAL SELECTORS IN SOME PATHS

Filed March 27, 1967 13 Sheets-Sheet 8

INVENTORS
DAVID MARTIN LEAKEY
RICHARD FRANCIS BENTINCK SPEED
BY Kirschstein, Kirschstein & Ottinger
ATTORNEYS INVENTORS
DAVID MARTIN LEAKEY
RICHARD FRANCIS BENTINCK SPEED
BY Kurtiliam, Kurtilam and Offen
ATTORNEYS

SWITCHING SYSTEM USING ADDITIONAL SELECTORS IN SOME PATHS

Filed March 27, 1967 13 Sheets-Sheet 10

INVENTORS
DAVID MARTIN LEAKEY
RICHARD FRANCIS BENTINCK SPEED
BY [signature]
ATTORNEYS INVENTORS
DAVID MARTIN LEAKEY
RICHARD FRANCIS BENTINCK SPEED
BY [signature]
ATTORNEYS

SWITCHING SYSTEM USING ADDITIONAL SELECTORS IN SOME PATHS

INVENTORS
DAVID MARTIN LEAKEY
RICHARD FRANCIS BENTINCK SPEED
BY Kinzer, Dorn & Zickert
ATTORNEYS

INVENTORS
DAVID MARTIN LEAKEY
RICHARD FRANCIS BENTINCK SPEED
BY
ATTORNEYS

United States Patent Office 3,489,858
Patented Jan. 13, 1970

3,489,858
SWITCHING SYSTEM USING ADDITIONAL SELECTORS IN SOME PATHS

David Martin Leakey and Richard Francis Bentinck Speed, Rugby, England, assignors to The General Electric Company Limited, London, England, a British company Filed Mar. 27, 1967, Ser. No. 626,283
Claims priority, application Great Britain, Mar. 28, 1966, 13,497/66
Int. Cl. H04m 3/42
U.S. Cl. 179—18 6 Claims

ABSTRACT OF THE DISCLOSURE

A telephone switching system having a plurality of reed relay final selector units to each of which access is gained by way of one or more reed relay group selector units depending upon the director number of a wanted subscriber. Each group selector unit is controlled by the first two of four decimal digits to which the system is responsive while each final selector unit is controlled by the last three of these digits, the relevant digits being signalled forward one at a time by a characteristic combination of voltages on the speech wires. For the purpose of controlling the signalling forward of the appropriate digits to the group and final selector units, these two types of units are each arranged to send back identifying signals when a connection is made thereto.

This invention relates to telecommunications switching systems.

According to the present invention, in a telecommunications switching system having a rank of first selector units followed by a rank of second selector units, the second selector units being adapted each to provide connections to outlet paths of the system and the first selector units being adapted each to provide connections to outlet paths thereof in a plurality of levels which each consist of a plurality of separate paths, the output paths of corresponding levels being multipled and the number of said levels being less than the number of second selector units although the paths of some levels may be directly connected to second selector units, one or more additional selector units, which may be similar to the first selector units, are provided between the paths of a level of the first selector units that are not directly connected to a second selector unit and a plurality of said second selector units while each of the first selector units and the additional selector units has a individually associated register which is adapted to respond to two or more items of information (for example two or three decimal digits) signalled to that unit and to control that unit to make connection to a free path from that unit in a level determined by that information, the arrangement being such that, during setting up a connection through the system a first selector unit operates under the control of said items of information signalled thereto to make connection either to a free path to the appropriate second selector unit or to a free path to one of said additional selector units and in the latter case the additional selector unit operates under the control of said items of information that are then signalled thereto to make connection to an appropriate free path from that unit.

The second selector units may constitute final selector units of the switching system in which case each second selector unit has a plurality of output paths of the system uniquely associated therewith.

At least one of the first selector units and/or of the additional selector units may have means responsive to all the outlet paths in a particular level thereof being in use to modify the response of that unit in respect of information signalled thereto that would normally require connection to be made to an outlet path in that level so as to cause the unit to make connection over a free outlet path of another level to a further selector unit which may be similar to the first selector units and which has an individually associated register, the arrangement being such that, when connection is made to this further selector unit, said items of information are again signalled thereto to enable a connection to be made to an appropriate free path from that unit.

Figure 1:
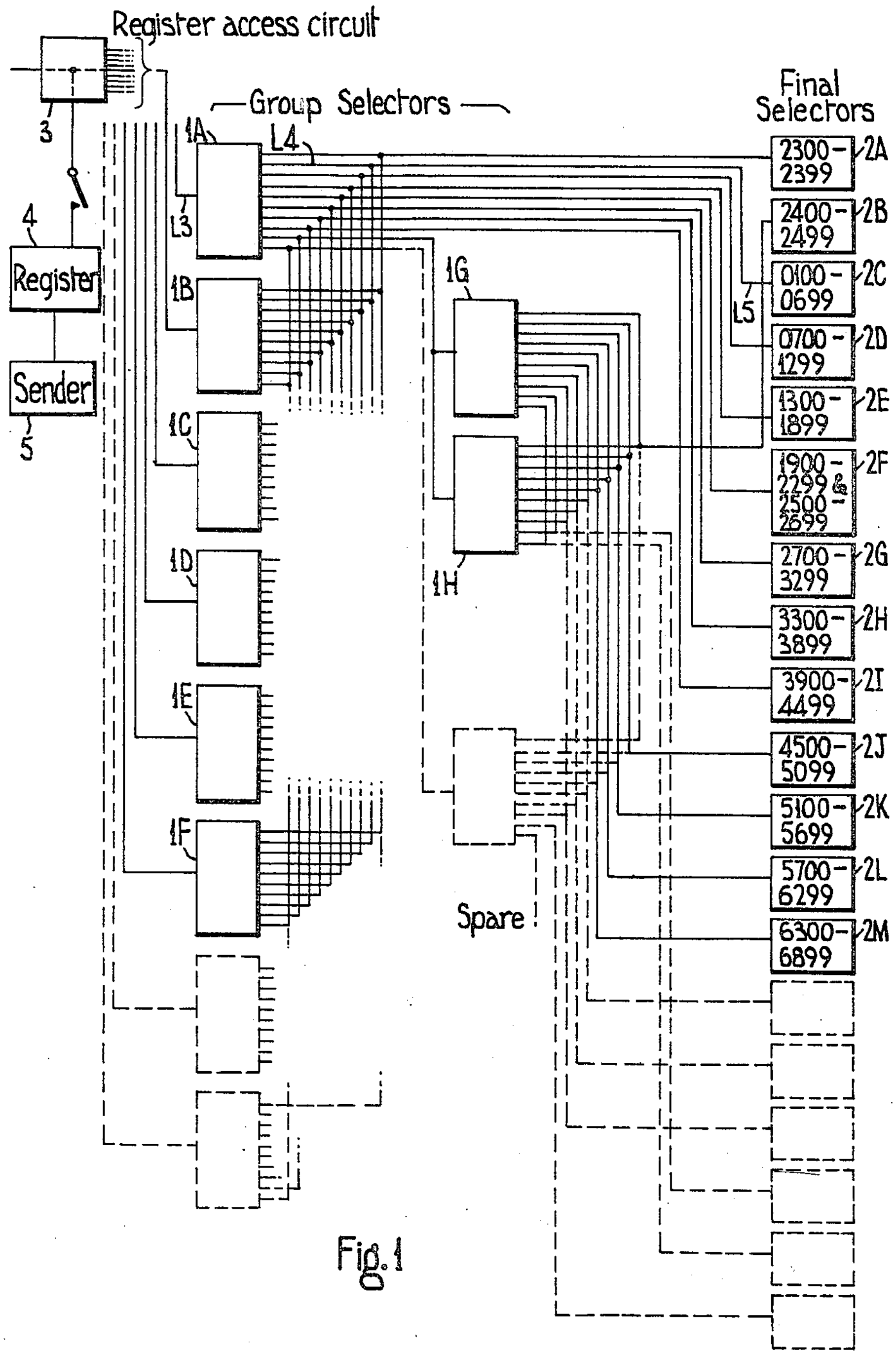
Figure 2:
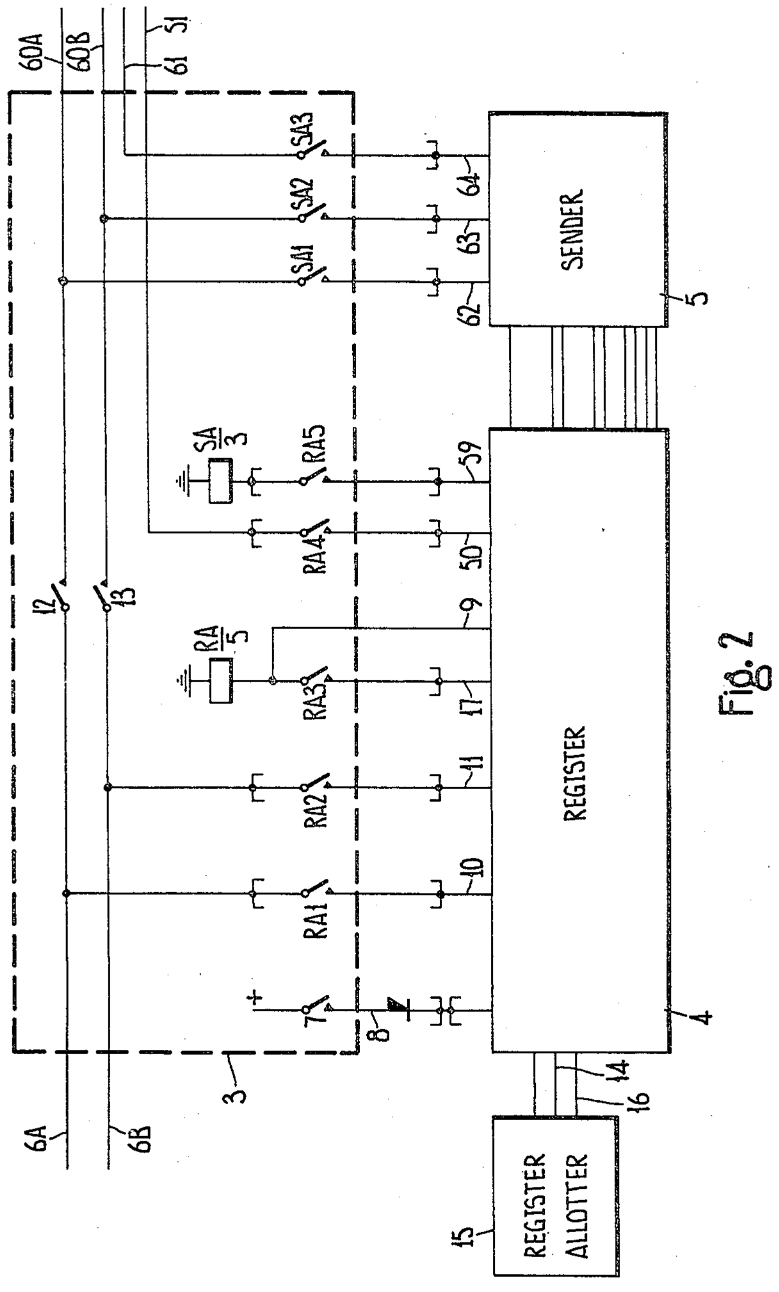
Figure 3:
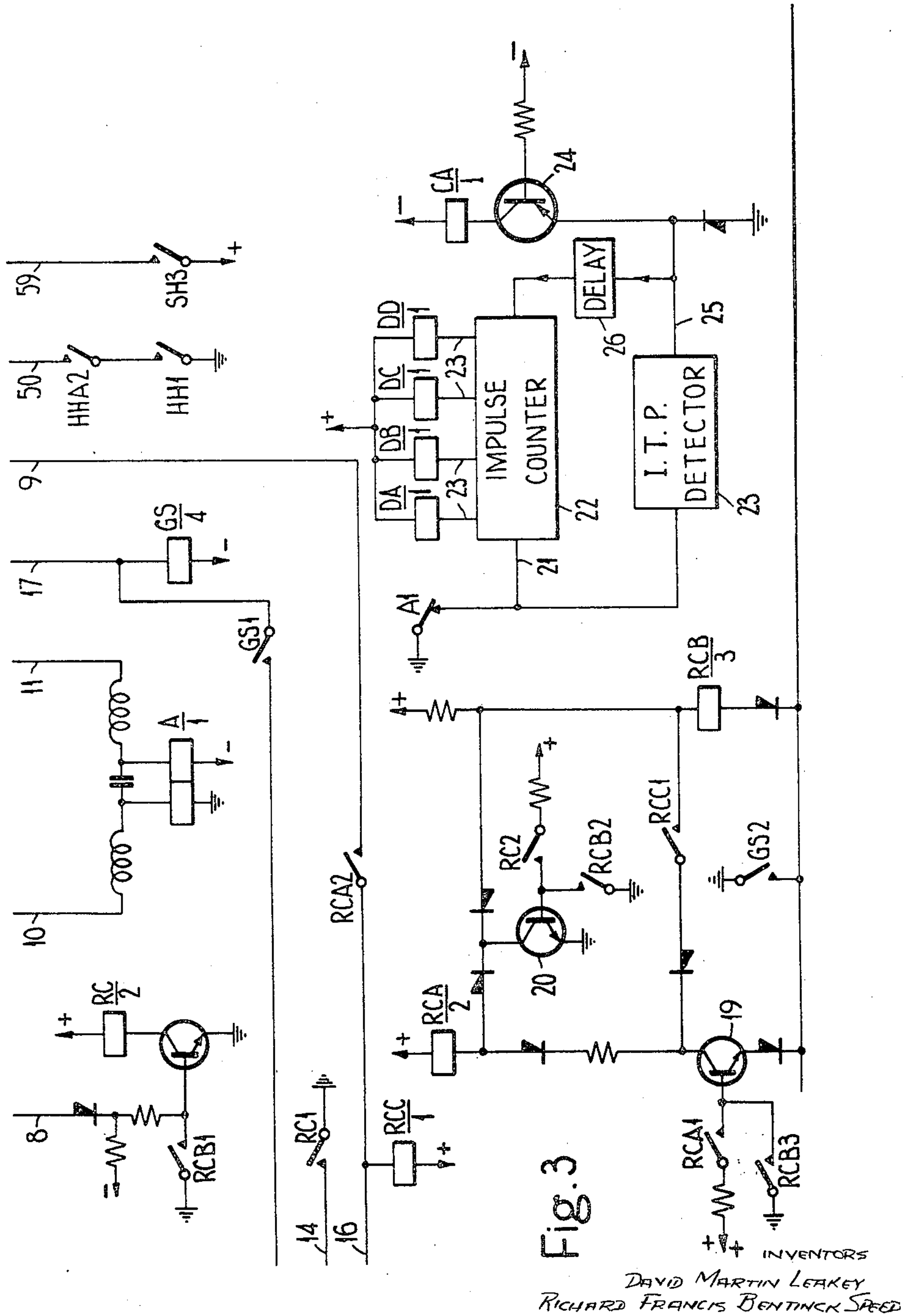
Figure 8:
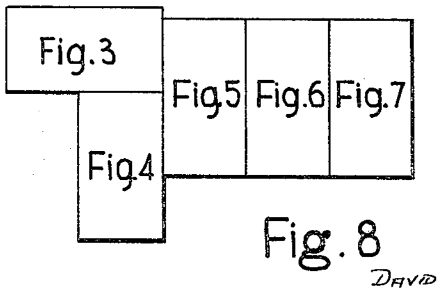
Figure 12:
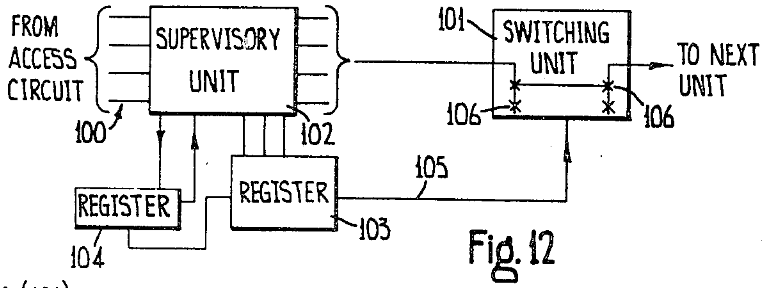
Figure 13:
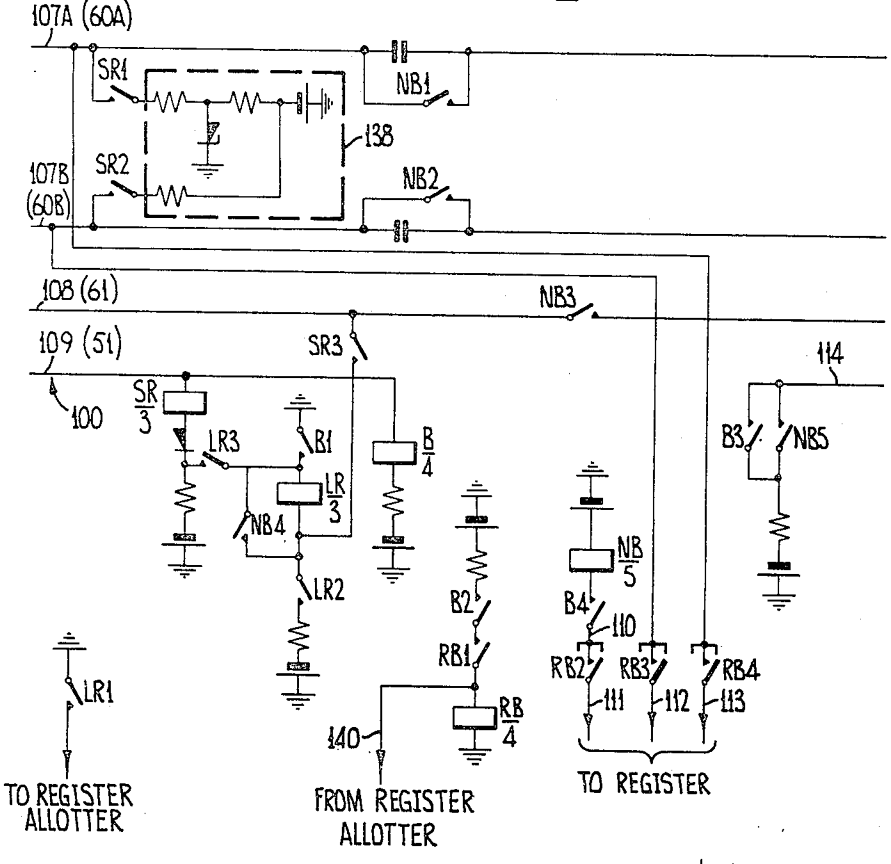
Figure 14:
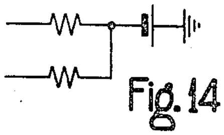
Figure 15:
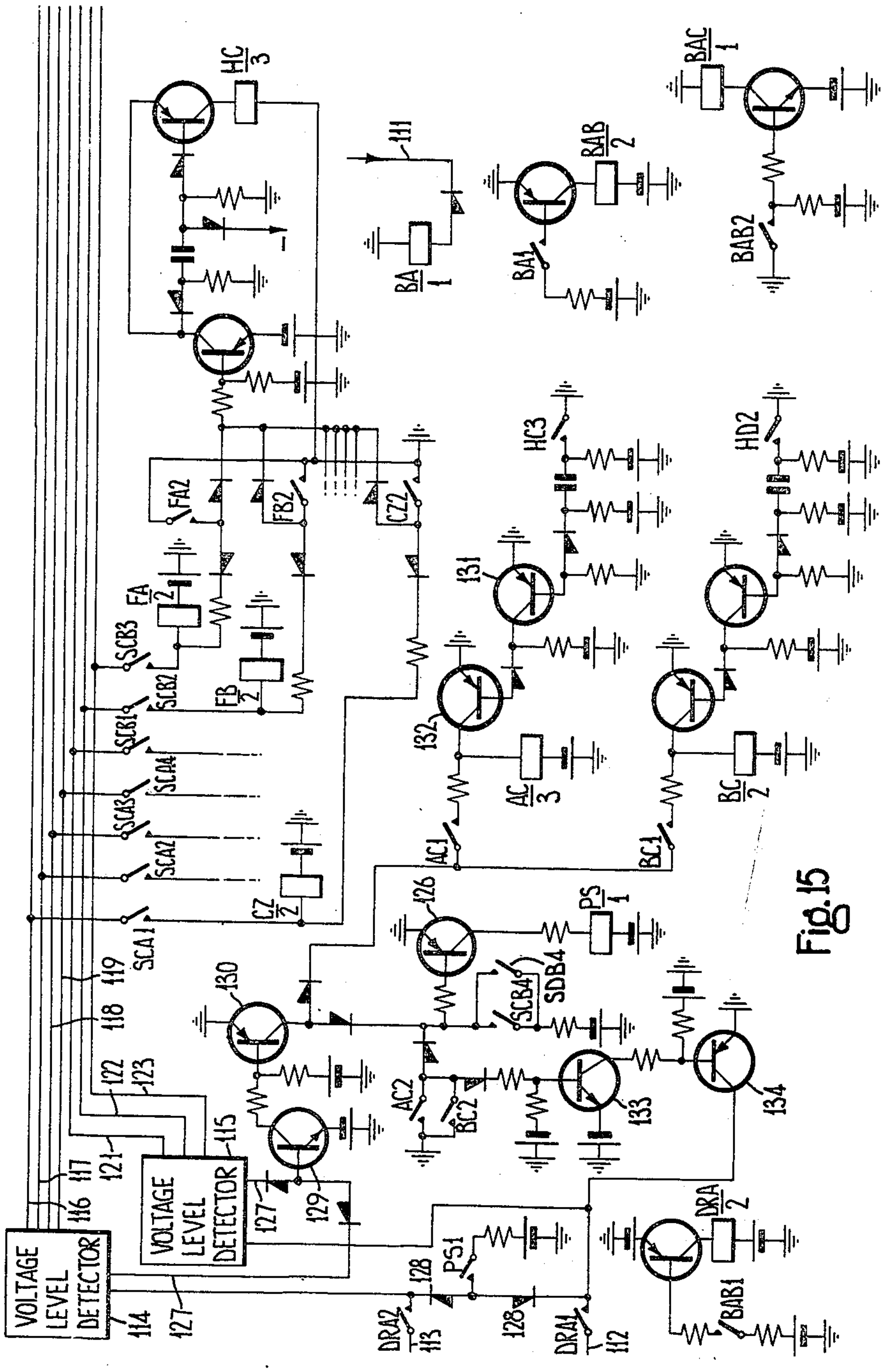
Figures 16, 17:
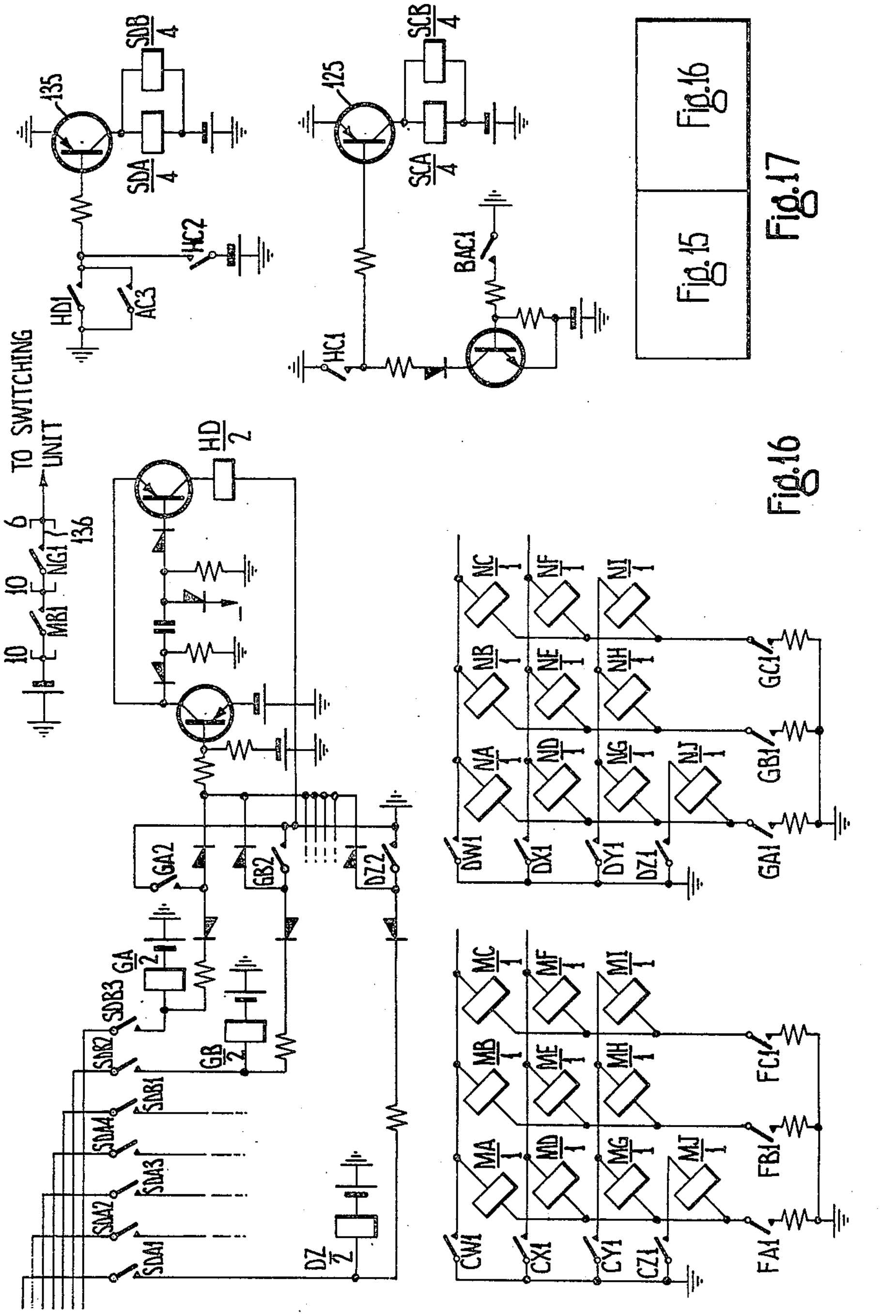

An automatic telephone exchange in accordance with the present invention will now be described by way of example with reference to the accompanying drawings in which FIGURE 1 shows diagrammatically the trunking between the various switching units of the exchange, FIGURES 2 and 12 show parts of FIGURE 1 in more detail, FIGURES 3 to 7, when arranged as in FIGURE 8, and FIGURES 9 and 10, when arranged as in FIGURE 11, respectively, show the circuit of the register and of the sender of FIGURE 2, FIGURE 13 and FIGURES 15 and 16, when arranged as in FIGURE 17, respectively show the circuits of the supervisory unit and of the register of FIGURE 12, FIGURE 14 shows an alternative form of part of FIGURE 13, and FIGURE 17 shows part of FIGURE 15 in more detail.

Referring now to FIGURE 1, switching its effected in the exchange under consideration by means of selector units 1A to 1H and 2A to 2M utilising electromagnetic relays of the sealed reed type, each of these units being adapted to provide connection between any one of a plurality of input paths thereof and any one of a plurality of output paths thereof. (It is to be understood that each of these "paths" comprises two wires for the two-way transmission of speech signals together, where appropriate, with one or more additional wires for supervisory and control purposes. Furthermore each selector unit may comprise, in known manner, two or more tandem-connected switching stages each formed by a matrix of reed relays.) These selector units are in fact of two kinds which are hereinafter referred to as "group selector units," namely the units 1A to 1H, and "final selector units," namely the units 2A to 2M, respectively.

The group selector unit 1A, for example, has 96 input paths (represented by the line L3) and 200 output paths which are arranged in ten levels of 20 paths each, the line L4 representing such a group of 20 paths, and a connection is made to a free output path in a particular level in dependence upon the directory number of a called subscriber during the setting up of a call through the exchange as will subsequently be apparent.

The final selector units 2A to 2M potentially each have 45 input paths represented by the line L5, for example, and 1000 output paths (not shown) although in practice somewhat smaller numbers of paths may be utilised depending upon the traffic loading.

The exchange is adapted to respond to four decimal digits in respect of the directory number of a called subscriber, information in respect of such a number being supplied by the calling subscriber as four impulse trains or by audio frequency signalling in known manner. The first two digits are utilised to control the group selector units 1A to 1H which are arranged in a main rank, namely the units 1A to 1F, and an additional rank, namely the units 1G and 1H, while the last three digits are, utilised to control the final selector units 2A to 2M which form a single rank. The output paths (not shown)

of the final selector units are formed by two-wire circuits which are uniquely connected to a plurality of subscribers. In FIGURE 1, the directory numbers of the subscribers connected to each final selector unit are shown within the rectangle representing each such unit.

The input paths of each of the eight final selector units 2A to 2H are connected by means of a graded multiple to the output paths in the same levels of all the group selector units 1A to 1F, each of these final selector units being connected in this way to a different level of these group selector units. This enables the group selector units 1A to 1F to have direct access to the eight final selector units 2A to 2H.

Access from output paths in one of the remaining levels of the group selector units 1A to 1F to the final selector units 2I to 2M is by way of one of the group selector units 1G and 1H in the additional rank. For this purpose the input paths of the group selector units 1G and 1H are connected by way of a graded multiple to the output paths of the appropriate level of the group selector units 1A to 1F. The input paths of the final selector units 2I to 2M are connected by means of a graded multiple to the output paths in the same level of the group selector units 1G and 1H in similar manner to that previously described in connection with the final selector units 2A to 2H.

Access to the input paths of the group selector units 1A to 1F is obtained from an incoming junction circuit and/or from earlier stages of switching in the exchange by way of one of a plurality of register access circuits 3. A plurality of register 4, (only one of which is shown in the drawing) are associated with this circuit 3. When a call is being set up, one of these registers 4 is connected to the appropriate access circuit 3 and is arranged to store the four numerical digits characterising the called subscriber that are signalled thereto.

The exchange also has provision for two-way signalling between the registers 4 on the one hand and the group selector units 1A to 1H and the final selector units 2A to 2M on the other hand. This signalling is effected by applying different voltages to the two speech wires of the appropriate paths.

Each of the group selector units 1A to 1H has an associated register (not shown in FIGURE 1) which is arranged to store the first two decimal digits that are signalled thereto from a register 4. (It will be appreciated that these two digits characterise the level in which a free output path from a group selector unit 1A to 1H is required whether that unit is in the main or additional rank of such units. Each group selector unit 1A to 1H effectively has a translation network having one hundred input terminals and ten output terminals corresponding to the ten levels of output paths and this enables the required output level to be selected.)

In similar manner each of the final selector units 2A to 2M has an associated register (not shown in FIGURE 1) which is arranged to store the last three digits that are signalled thereto from the appropriate register 4. Again each of these units 2A to 2H has an associated translation network which enables a particular output path from one of these units to be selected in dependence upon the value of these digits.

It will be appreciated that when a call is being set up the first two digits stored by the appropriate register 4 are signalled to one of the group selector units 1A to 1F and the appropriate switching to a free output path of the relevant group selector unit is effected in known manner. If then the appropriate register access circuit 3 is connected through to one of the group selector units 1G to 1H, the first two digits stored by the register 4 are again signalled to that group selector unit to enable the necessary switching to be effected. When the register access circuit 3 is connected through to one of the final selector units 2A to 2M, either directly from the main rank of group selectors or via the additional rank of those units, the last three digits stored by the register 4 have to be signalled forward to the relevant final selector unit. When forward signalling of digits is required, it is therefore necessary for the register 4 to know the type of selector unit to which it is signalling. For this purpose the group selector units 1A to 1H and the final selector units 2A to 2M are each arranged to send back to the register 4 when connection has been made thereto a signal identifying the type of that unit. For the purpose of identifying the group selector units in this manner —12 and —50 volts are applied to the A and B speech wires respectively while to identify a final selector unit —50 volts is applied to both the A and B wires.

Decimal digits are signalled forward from the register 4 to the registers of the group selector units 1A to 1H and of the final selector units 2A to 2M at high speed. For this purpose each digit is characterisbed by two voltages that are applied to the A and B wires under the control of a common sender 5, the voltage of an A wire being one of four possible values namely —7.5, —18.6, —31 and —50, while the voltage on the B wire is one of three possible values namely —7.5, —18.6 and —31. (It will be appreciated that these combinations of voltages enable the ten possible values of a decimal digit to be signalled.) When a digit has been signalled forward in this manner and received by the appropriate register of one of the selector units 1A to 1H or 2A to 2M a "digit acknowledge" signal is sent back to the register 4 by earthing the B wire. The next digit, if there is one, is then signalled forward in similar manner. The condition that all the necessary digits have been deceived by the register of a selector unit 1A to 1H or 2A to 2M may be signalled back to the register 4 by applying earth to both the A and B wires.

The circuitry of those parts of the exchange under consideration that are relevant to the present invention will now be considered in more detail. Considering first FIGURE 2, the register access circuit 3 responds in known manner to the incoming line wires 6A and 6B being looped to close relay contacts 7 to supply a register demand signal to a lead 8. When a free register 4 has been allocated to the access circuit 3 as will subsequently be described, a voltage is supplied over a lead 9 to operate a relay RA that is individually associated with that particular register. Contacts RA1 and RA2 are therefore closed at this time to extend the lead wires 6A and 6B to leads 10 and 11 that are connected to the allotted register 4. (Although not shown in FIGURE 2, each register access circuit 3 has a plurality of relays corresponding to the relay RA so that each access circuit may be connected to any one of a plurality of registers.) It is convenient while considering the access circuit 3 to mention that at a later stage during the setting up of a call relay contacts 12 and 13 are closed in known manner so as to extend the line wires 6A and 6B through one or more group selector units 1A to 1H to one of the final selector units 2A to 2M (FIGURE 1).

Turning now to consideration of the register 4 with particular reference to FIGURES 3 to 8 of the accompanying drawings, the register demand signal supplied over the lead 8 causes the relay PC of all registers that are then free to be operated. A demand signal is then supplied to a common register allotter 15 (FIGURE 2) by earthing a lead 14 by way of contacts RC1. Closure of contacts RC2 cause relay RCA to be operated.

The allotter 15 operates in known manner to select one of the registers 4 that is indicated to it as being free by supplying positive voltage to a lead 16 that is individual to the allotted register. This voltage is supplied by way of contacts RCA2 to the lead 9 so as to cause the relay RA (FIGURE 2) to operate as aforesaid. Closure of contacts RA3 complete an operating circuit for a relay GS and at the same time provide a holding circuit for the relay RA. Positive voltage on the lead 16 also causes relay RCC to operate.

Upon operation of the relay GS contacts GS2 apply earth to a lead 18 but operation of relay RCB is temporarily inhibited by the path through relay contacts RCC1 and a transistor 19 that is conducting at that time. Subsequently contacts 7 open to remove the register demand signal whereupon the relay RC releases and when the allotter 15 removes the marking voltage on the lead 16 the relay RCC also releases. Since at this time contacts RCB3 earth the base electrode of the transistor 19 that transistor is non-conducting as also is the transistor 20 through which the relay RCA was initially operated, the relay RCA is also released.

The input wires 6A and 6B (FIGURE 2) were earlier assumed to be looped and the effect of extending these wires through relay contacts RA1 and RA2 to leads 10 and 11 results in a relay A being operated. Each decimal digit of the required subscribers number is signalled over the line wires 6A and 6B as a train of impulses in known manner. Each such impulse causes the relay A temporarily to be released. The input lead 21 of a four-stage binary counter 22 is thus momentarily earthed by way of contacts A1 upon the receipt of each impulse. The counter 22 counts the number of impulses in a train characterising a decimal digit and signals representing the result of this count are supplied over leads 23 to four relays DA, DB, DC, and DD. In general a combination of these four relays are operated in respect of a decimal digit, operation of the relays DA, DB, DC and DD signifying counts of 1, 2, 4 and 8 impulses respectively. The end of a train of impulses is ascertained by an inter-train pause detector 23.

A relay CA is normally operated by current through a transistor 24. However when the detector 23 supplies a positive voltage over lead 25 when the end of a train of impulses has been detected, the transistor 24 is rendered non-conducting and the relay CA is temporarily released. The signal on the lead 25 is also passed through a delay network 26, which may be a simple resistance-capacitance network, to reset the counter 22 and thereby release the relays DA to DD that had been operated.

The binary representation of each of the four decimal digits that are impulsed to the exchange in respect of the number of a wanted subscriber is transferred to a digit store 27 under the control of a digit distributor 28. Thus when the relay CA is temporarily released as aforesaid at the end of the first train of impulses, the earth connection to the lead 29 (via a transistor 30) in the distributor 28 is momentarily interrupted so as to enable the relay AA to operate. This causes one or more of four relays 1SA to 1SD to be operated corresponding to those of the relays DA to DD that had previously been operated. The first decimal digit is thus stored by the state of the relays 1SA to 1SD and those of these relays that are operated are held in that state by way of contacts 1SA1 to 1SD1 when the relays DA to DD are released. Similarly upon the end of the second train of impulses being detected the relay AB in the distributor 28 is operated and the second decimal digit is stored by the state of the relays 2SA to 2SD. The third and fourth digits are stored in like manner by the relays 3SA to 3SD and 4SA to 4SD respectively.

The read out of decimal digits stored by the digit store 27 is effected under the control of a distributor 31 which comprises three transistors 32, 33 and 34. The arrangement of the distributor 31 is such that only one of the transistors 32 to 34 is conducting at any time, the transistor 32 being conducting initially as a result of contacts RCA2 being momentarily closed. It will be appreciated that no further action need be taken by the register 4 until two decimal digits of the wanted subscriber's number are stored thereby. When however the second digit is stored, as is evident by one or more of the contacts 2SA3 to 2SD3 being closed, a signal is passed through the contacts RGS1 (the relay RGS being operated at this time as a result of the contacts GS4 being closed), a diode 35, and one or more of the contacts 2SA3 to 2SD3 to cause two transistors 36 and 37 to be conducting. This in turn causes relays ASR, HH and DR to be operated and contacts DR1 closing provide a holding circuit for the relay DR. Transistors 52 and 53 are also caused to conduct so that relays SH and HHA are operated. (The operating circuit of relay HHA is completed by way of contacts HH2 and a transistor 54 that is conducting in dependence upon the transistor 52 being conducting.) The relay HHA is subsequently held operated over contacts HHA1.

Contacts ASR1 closing complete an operating circuit for two relays RSA and RSB and closure of contacts RSA2 to RSA5 and RSB1 to RSB4 extend various leads of the register to leads 41 to 48 that are connected to the common sender 5. (Although not described herein as it is irrelevant to the present invention, there may be provision for ensuring that only one register 4 at a time can be connected to the common sender 5 in this manner.)

Positive bias is then supplied over contacts RSA1 and SH2 to the base electrode of a transistor 49 which is therefore caused to conduct and thereby operate a relay SS. At the same time a holding circuit for the relays RSA and RSB is established by way of diodes 55 and 56 and the transistor 49. Relay ASR is subsequently released.

A lead 50 is earthed via contacts HH1 and HHA2 so that, by way of contacts RA4 in the register access circuit 3, earth potential is applied over a lead 51 to the group selector unit to which that circuit is permanently connected. (The significance of this earth connection will subsequently be described.)

Positive voltage is applied to the register access circuit 3 by way of a lead 59 upon closure of contacts SH3. This causes a relay SA in the circuit 3 to be operated so as to extend the outgoing speech wires 60A and 60B and another wire 61 by way of contacts SA1, SA2 and SA3 to leads 62, 63 and 64 that are connected to the sender 5.

Furthermore, a lead 57 is effectively connected at this time to the lead 18 (which is earthed via contacts GS2) by way of the transistor 49, diodes 55 and 58 and relay contacts SS1 and HHA4. The lead 57 is connected to the sender 5 and earthing it in this manner has the effect of seizing the sender.

Figure 9:
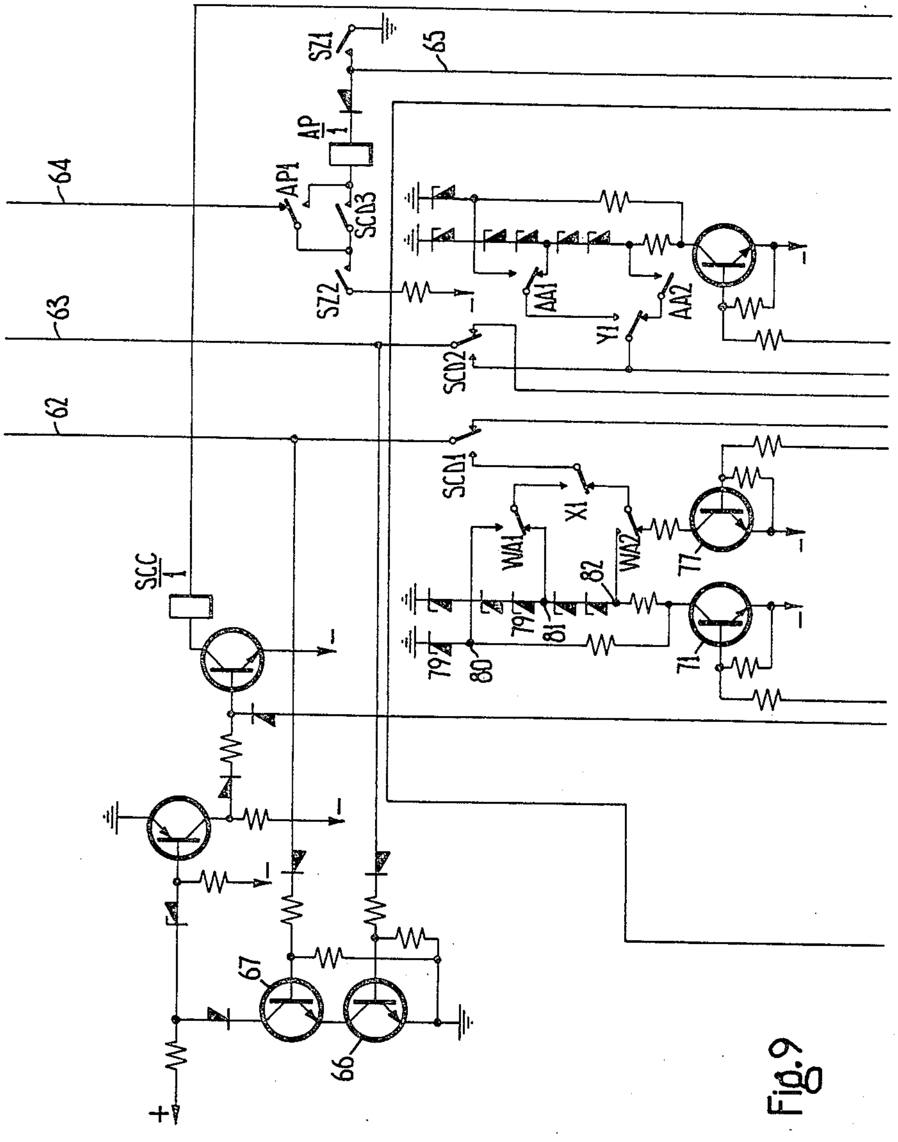
Figures 10, 11:
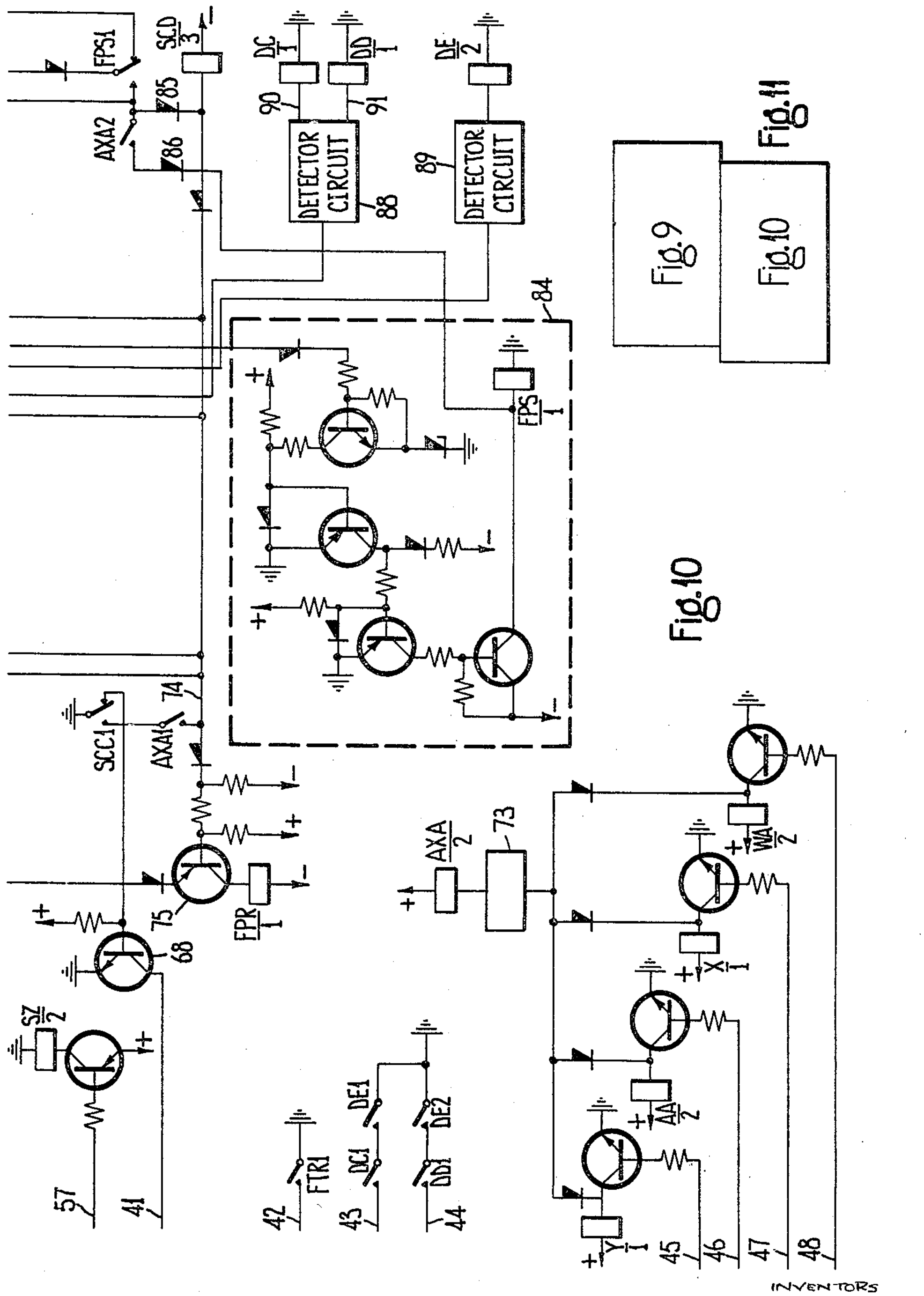

Turning now to consideration of the sender 5 with particular reference to FIGURES 9 to 10, the effect of earthing the lead 57 as aforesaid is to operate a relay SZ. Contacts SZ1 of this relay complete an earth connection to a lead 65 while a negative voltage is applied to the lead 64 by way of contacts SZ2 and relay contacts AP1. This signal applied to the lead 64 is passed through the access circuit 3 to the appropriate group selector unit so as to render it operative as will subsequently be described. When that group selector unit is ready to receive digits signalled forward to it, a "proceed to send" signal is passed back from that unit, the "proceed to send" signal consisting of +12 volts applied to both the speech wires.

The "proceed to send" signal is passed back to the sender 5 by way of the leads 62 and 63 and causes two transistors 66 and 67 to be conducting. A conducting path is therefore set up through the transistor 66 and 67 with the result that a relay SCC is operated.

Operation of relay SCC causes the earth connection to the base electrode of a transistor 68 by way of contacts SCC1 to be interrupted so that the transistor 68 which was previously cut off is rendered conducting. The lead 41 is therefore effectively earthed.

Figure 4:
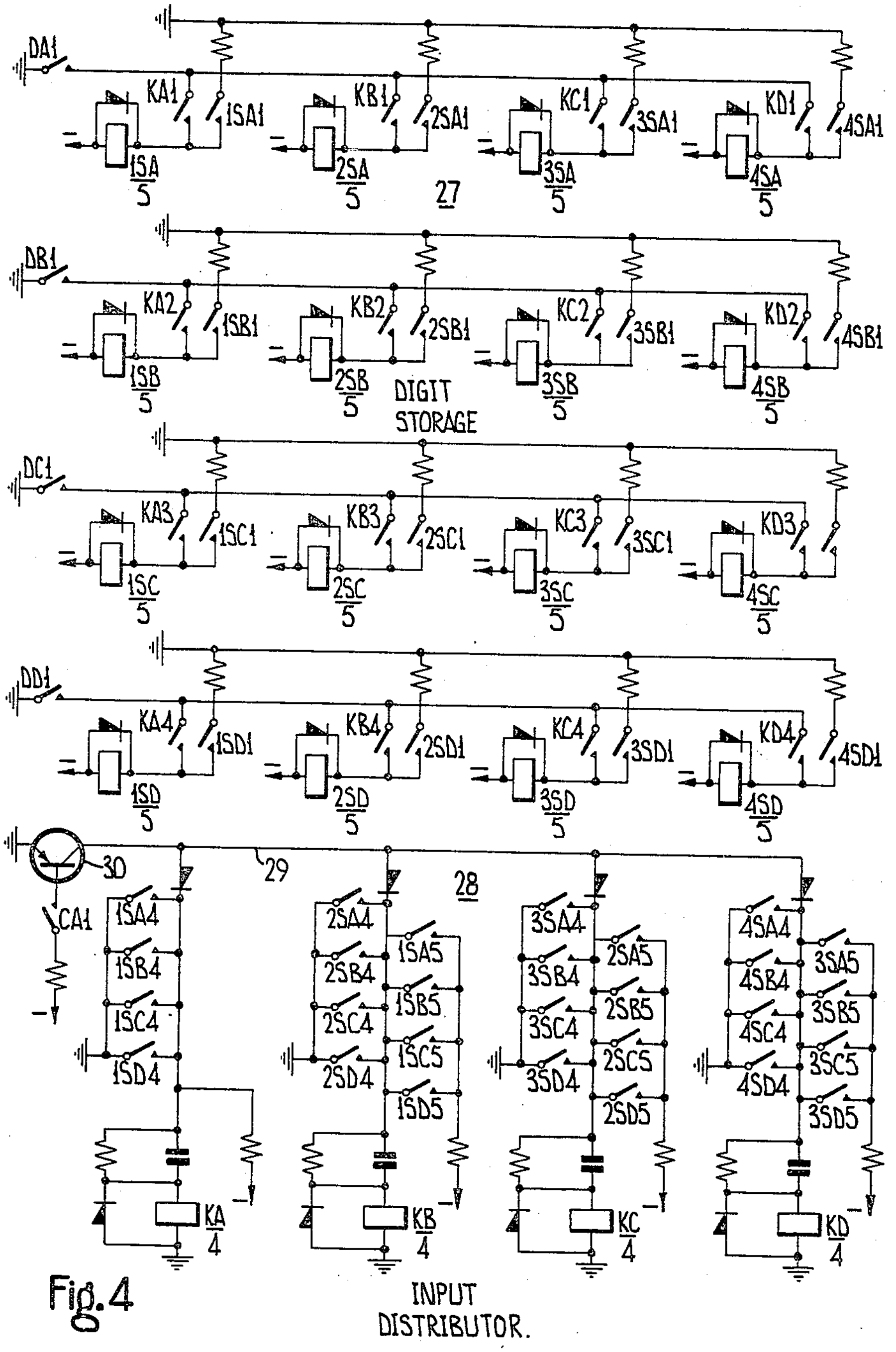
Figure 5:
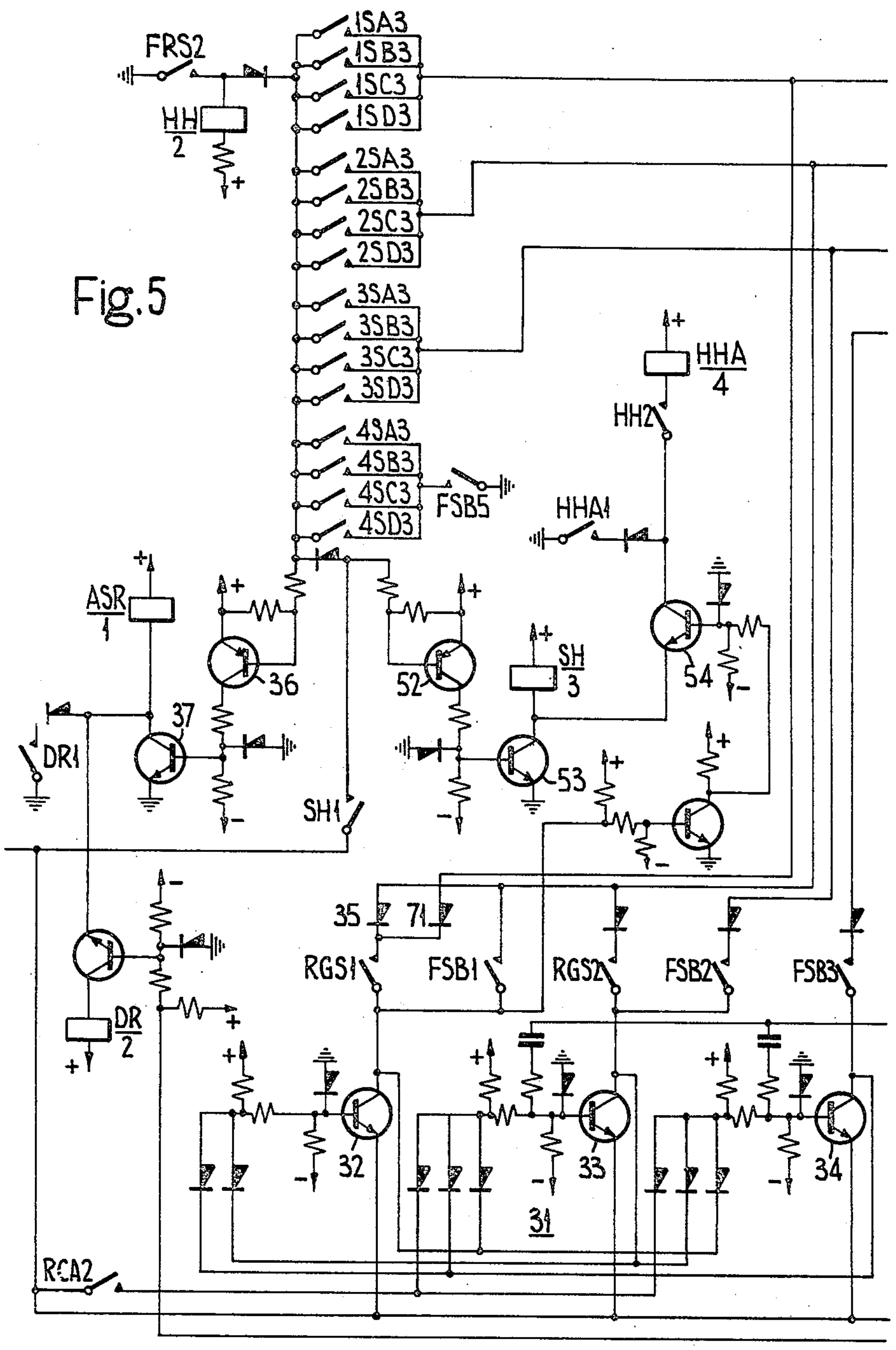
Figure 6:
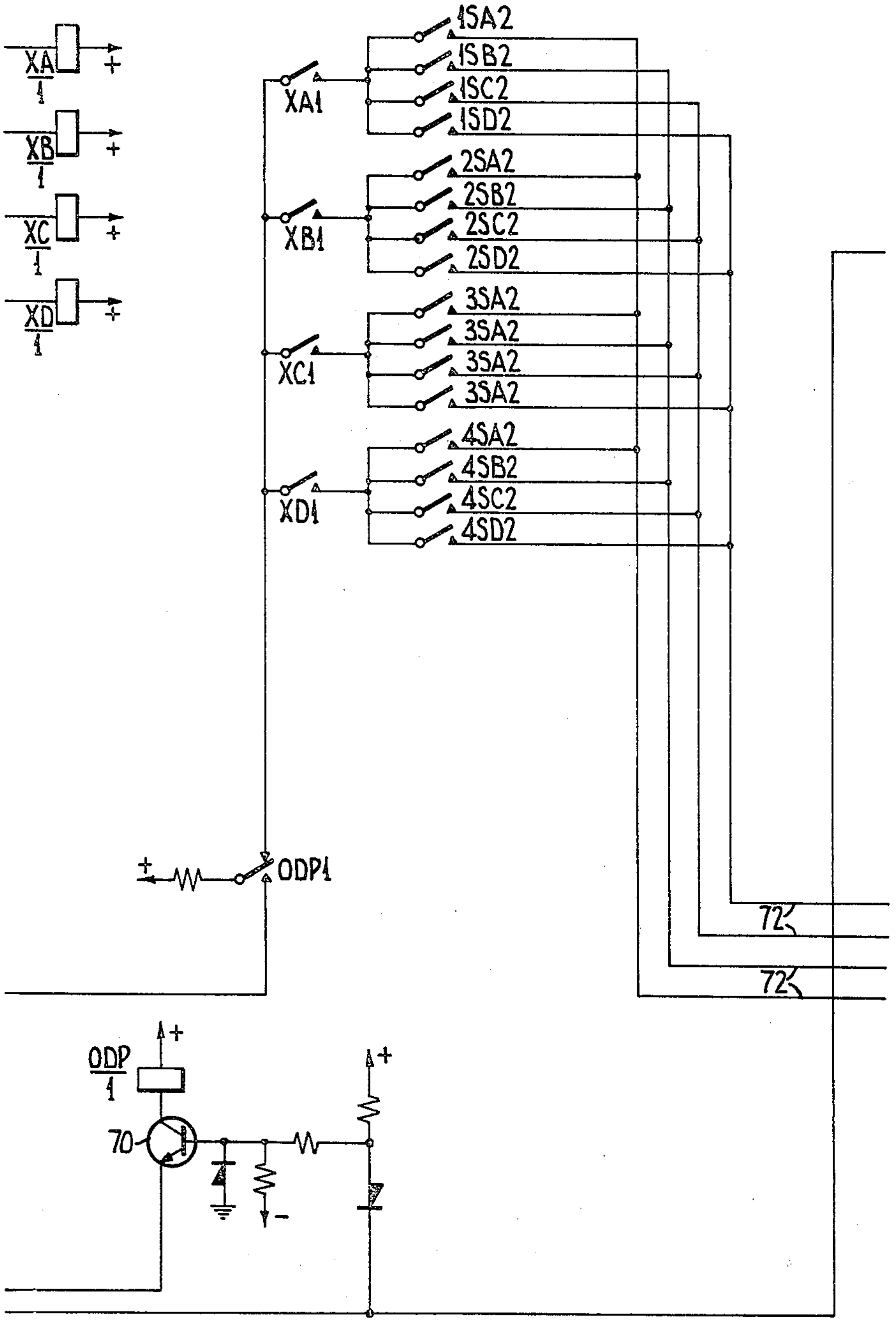
Figure 7:
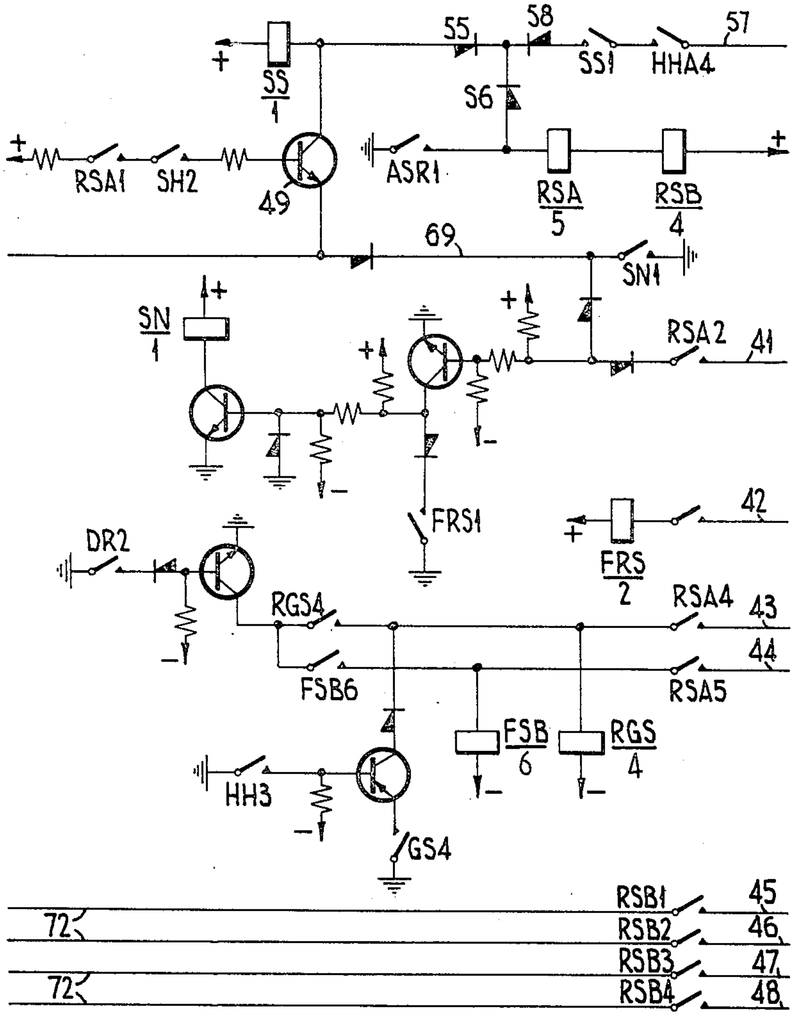

Reverting now to consideration of the register with particular reference to FIGURES 4, 5 and 6, earthing the lead 41 causes a relay SN to be operated. Contacts SN1 closing complete an earth connection to a lead 69 and at the same time provide a holding circuit for the relay SN.

A relay ODP is normally operated by current through a transistor 70. When however the lead 69 is earthed as just described, the transistor 70 is cut off and the relay ODP released. The contacts ODP1 thus revert to the position shown in the drawing.

Due to the fact that the transistor 32 in the distributor 31 is conducting at the time under consideration, current flows through the relay contacts RGS1 and a diode 71 so as to cause a relay XA to operate. When the relay ODP is released in the manner just described, positive voltage is applied through the contacts ODP1, contacts XA1 and one or more of the contacts ISA2 to ISAD2 so that signals characterising the first decimal digit in binary form are then present on the four leads 72. These signals are fed to the sender 5 by way of contacts RSB1 to RSB4 and leads 45 to 48.

As previously mentioned each decimal digit is signalled forward in a "one out of four" and "one out of three" code and the necessary code conversion is effected by means of relays Y, AA and WA. A short time after voltages have been applied to the leads 45 to 48 and to give the relays just mentioned time to operate, a relay AXA is operated, the necessary delay being introduced by a unit 73.

Closure of contacts AXA1 completes an earth connection to a lead 74, it being remembered that the relay SCC is already operated. The earth connection to the leads 74 causes a relay SCD to be operated. At the same time three transistors 76, 77 and 78 are biased to be conducting.

The arrangement of the transistors 76 and 77 and the Zener diodes 79 that are connected in the collector electrode circuit of the transistor 76 is such that the voltages developed at the points 80, 81, 82 and 83 are −7.5, −18.6, −31 and −50 respectively. One of these four voltages is selected by way of contacts WA1, WA2 and X1 for application to the lead 62 via contacts SCD1. Similarly one of the voltages −7.5, −18.6 and −31 is selected by means of contacts AA1, AA2 and Y1 for supply to the leads 63 by way of contacts SCA2.

As previously mentioned the relay SCD is operated and contacts SCD3 complete an operating circuit for a relay AP by way of contacts SZ1 and SZ2. The changeover contact AP1 is therefore operated so as to complete a holding circuit for the relay AP and at the same time to interrupt the negative voltage signal that was previously supplied to the lead 64.

When the appropriate group selector unit has received and stored this first decimal digit signalled thereto, it sends back the "digit acknowledge" signal by earthing the B wire. This condition, which overrides the positive voltage then being supplied to that wire for the purpose of signalling a digit forward, is fed back through contacts SCD2 to a circuit 84 and upon the condition being detected a relay FPS is operated.

The changeover of contacts FPS1 interrupts the operating circuit of the relay SCC but the relay SCD is still held operated (when relay SCC releases) by current flowing through contacts SZ1, FPS1 and a diode 85 to the lead 74. Furthermore the relay FPS is held operated (after the "digit acknowledge" signal ceases) by current flowing through contacts AYA2 and a diode 86.

When the relay SCC releases, the earth connection to the lead 74 is removed and a transistor 75 is caused to be conducting so that a relay FPR is operated. Contacts FPR1 of this relay complete an earth connection to the lead 42 so that relay FRS in the register is operated. This causes relay SN to be released and thereby reoperate relay ODP which in turn results in removal of the signals characterising the first decimal digit on the leads 72 and the leads 45 to 48.

Re-operation of relay ODP also results in a signal being supplied to the distributor 31 so that the transistor 33 is rendered conducting instead of the transistor 32. This causes the relay XA to be released and the relay XB to be operated.

Removal of the signals characterising the first decimal digit from the leads 45 to 48 causes the relay AXA to be released. This results in the relays FPS and SCD both being released.

The sender 5 then awaits receipt of the "proceed to send" signal and when this is again received the second decimal digit stored by the store 27 is signalled forward to the group selector unit in exactly the same manner as the first digit.

The operation of the sender 5 when subsequent signalling to one of the group selector units 1G to 1H or to a final selector unit 2A to 2M (FIGURE 1) is essentially the same as described above except that it is first necessary to respond to the signal fed back to the sender 5 as previously mentioned to identify the type of unit. For this purpose two detector circuits 88 and 89 are initially connected to the leads 62 and 63 by way of the contacts SCD1 and A2. The circuit 88 is arranged to supply a signal via a lead 90 to operate a relay DC1 when approximately −12 volts is detected on the lead 62 and a signal via a lead 91 to operate a relay DD when approximately −50 volts is similarly detected. Correspondingly the circuit 89 causes a relay DE to be operated when −50 volts is detected on the lead 63. Accordingly an identifying signal in respect of a group selector unit causes the lead 43 to be earthed over contacts DC1 and DE1 while an identifying signal in respect of a final selector unit causes the lead 44 to be earthed over contacts DD1 and DE2.

In the rigister 4, earth potential on the lead 43 causes relay RGS to operate so that the first two digits stored by the store 27 are signalled forward as previously. When, however, the lead 44 is earthed, the relay FSB is operated. This modifies the connections between the distributor 31 and the relays XA to XD so that when the transistor 32 is conducting the relay XB is operated with the result that the second decimal digit is signalled forward as required. Subsequently the transistor 33 (and later the transistor 34) is rendered conducting and the third (and fourth) decimal digit is signalled forward in exactly the manner previously described.

The circuitry of the group selector units relevant to the present invention will now be described. FIGURE 12 of the accompanying drawings shows diagrammatically the essential items of each of the group selector units 1A to 1H (FIGURE 1). Referring to this figure, each four-wire input path 100 is connected through the switching unit 101 by way of an individually associated supervisory unit 102. The group selector unit also has a plurality of registers 103 that are less in number than the number of input paths 100 and when a register 103 is required to be taken into use for the purpose of setting up a call, a free one is allotted for this purpose in known manner by means of a register allotter 104. As previously mentioned each register 103 is arranged to store two decimal digits that are signalled forward to it and when two such digits have been received and stored a potential is applied over one of a group of leads 105 to mark the output level of the switching unit 101 to which connection is required. The switching unit 101 has two stages of read relay switches 106. This type of switching unit is well known in the art and since its particular construction is not relevant to the present invention it will not be described further herein.

Referring now to FIGURE 13 which shows the circuit of a supervisory unit 102 in more detail, the input path 100 consists of two speech wires 107A and 107B and two control or supervisory wires 108 and 109. It will be appreciated that as far as the group selector units 1A to 1F are concerned, the wires 107A, 107B, 108 and 109 correspond to the wires 60A, 60B, 61 and 51 respectively extending from the register access circuit 3. When the wire 109 is earthed to seize the supervisory unit 102, relays SR and B are operated. −12 and −50 volts are then applied respectively to the speech wires 107A and 107B by way of contacts SR1 and SR2 respectively to send back a signal identifying the selector unit as a group selector unit as aforesaid. (As far as the group selector units 1A to 1F are concerned this identifying signal is of no effect since the access circuit 3 is necessarily connected directly to a group selector unit.) Contacts SR3 and B1 closing complete a circuit from the wire 108 through a relay LR to earth so that when negative voltage is applied to the wire 108 the relay LR is operated. Closure of contacts LR2 complete a holding circuit for the relay LR while the contacts LR1 extend an earth connection to the register allotter 104 for the purpose of applying for a free register 103. Closure of contacts LR3 cause the relay SR to be released so that the unit identifying signal is removed from the wires 107A and 107B.

The register alloter 104 supplies a voltage over one of a group of leads 140 (only one of which is shown in the drawing) to identify the allotted register 103 with the result that a relay RB that is individually associated with that register is operated. Contacts RB1 complete a holding circuit for the relay RB while contacts RB2, RB3 and RB4 extend a lead 110 and the wires 107A and 107B to leads 111, 112 and 113 that are connected to the allotted register 103.

Closure of contacts RB2 cause a relay NB in the supervisory unit 102 and a relay BA in the register 103 to be operated. Contacts NB1, NB2 and NB3 closing extend the wires 107A, 107B and 108 through the supervisory unit 102 to the switching unit 101, contacts NB4 cause the relay LR to be released, and contacts NB5 apply negative voltage to a lead 114 that is connected to the switching unit 101 for the purpose of preparing that unit for subsequent action.

Considering now the register 103 with particular reference to FIGURES 15 and 16, closure of contacts BA1 cause a relay BAB to be operated. A relay RA is operated upon closure of contacts BAB1 and contacts DRA1 and DRA2 of this relay serve to extend the leads 112 and 113 to the rest of the register and in particular to two voltage level detectors 114 and 115.

Figure 18:
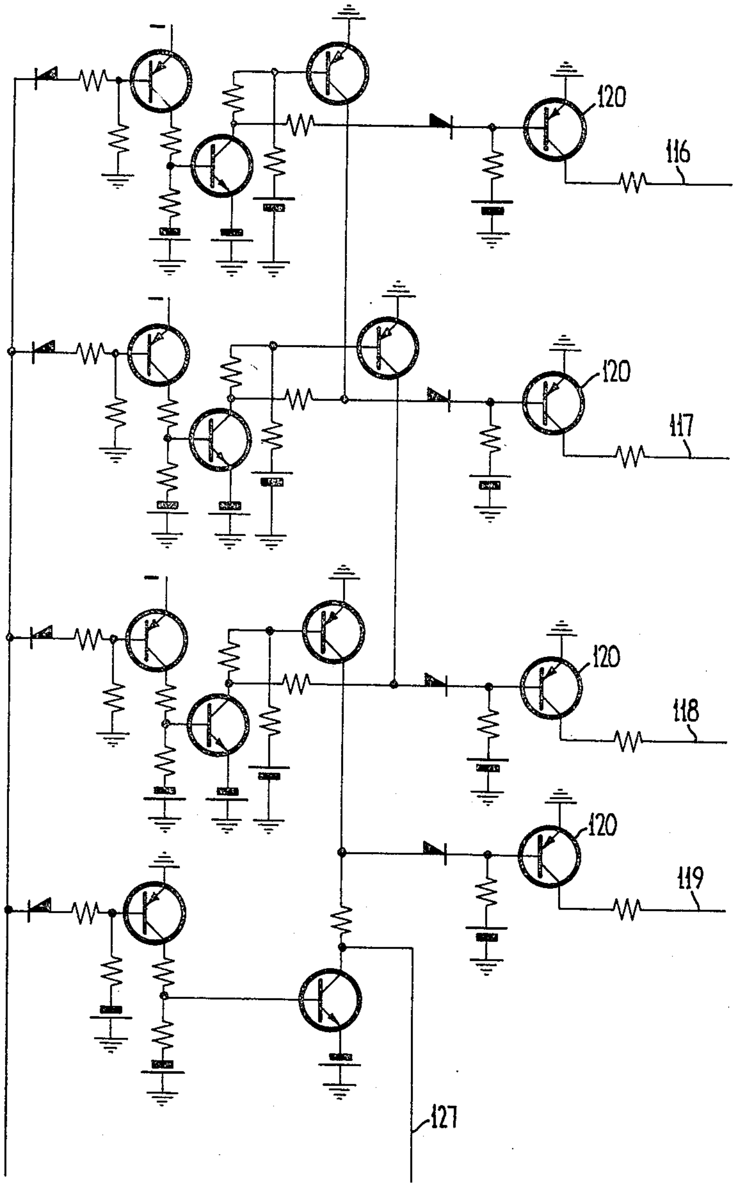

The voltage level detector 114 is arranged to detect any one of the four voltage levels passed thereto from the sender 5 over the A wire when a decimal digit of the wanted subscribers number is being signalled forward. The detailed circuit of this detector 114 is shown in FIGURE 18 and the four different voltage levels cause earth potential to be applied to one of four leads 116 to 119 by way of one of the transistors 120. Similarly the voltage level detector 115 causes one of the three leads 121, 122 and 123 in dependence upon the voltage supplied thereto from the B wire. (It will of course be appreciated that at this time no decimal digit is being signalled forward from the sender 5.)

Relay BAC is operated by contacts BAB2 closing and closure of contacts BAC1 cause transistors 124 and 125 to be conducting so that relays SCA and SCB are operated. At this time a negative voltage is supplied to the base electrode of a transistor 126 by way of contacts SCB4 with the result that the transistor 126 is caused to conduct and operate a relay PS. +12 volts is applied to the leads 112 and 113 by way of contacts PS1, two diodes 128 and contacts DRA1 and DRA2. This constitutes the "proceed to send" signal that is sent back to the sender 5 as previously mentioned.

When the first decimal digit is signalled forward in the manner previously described, it will be appreciated that the detectors 114 and 115 cause one of the leads 114 to 119 and one of the leads 121 to 123 to be earthed. As a result one of four relays CW, CX, CY and CZ is operated as also is one of three relays CA, CB and CC. (Only some of these relays are shown in the drawing.)

It may be mentioned here that as soon as either the detector 114 or the detector 115 responds to an incoming digit, signals are applied over one of two leads 127 so as to cause two transistors 129 and 130 to be conducting. The transistor 130 effectively removes the base electrode bias from the transistor 126 so that the relay PS is then released thereby removing the "proceed to send" signal.

The relays CA to CC and CW to CZ that had been operated in respect of an incoming digit are held operated over contacts such as the contacts CA2 in respect of the relay CA. Furthermore after a short delay, to allow the relays CA to CC and CW to CZ to be correctly operated, a relay HC is operated.

The contacts CW1 to CZ1 and CA1 to CC1 are connected in a matrix with ten relays MA to MJ and the effect of one of the relays CW to CZ and one of the relays CA to CC being operated is to operate one of the ten relays MA to MJ that is characteristic of the first decimal digit signalled forward.

Upon operation of the relay HC, contacts HC1 cause the relays SCA and SCB to be released while contacts HC2 prepare a circuit for subsequent operation of relays SDA and SDB. Contacts HC3 cause transistors 131 and 132 to be conducting with the result that a relay AC is operated. The relay AC is subsequently held operated when relay HC releases over contacts AC1.

Closure of contacts AC2 cause transistors 133 and 134 to be conducting with the result that the leat 112 is effectively earthed through the transistor 134. This results in the "digit acknowledge" signal being sent back to the sender 5.

Receipt of the "digit acknowledge" signal by the sender 5 results in the voltages characterising the first decimal digit being removed from the speech wires. The resulting condition is detected by the circuits 114 and 115 so that signals on the leads 127 disappear. This causes the transistor 130 to be cut off thereby releasing the relay AC. Contacts AC3 opening enable a transistor 135 to conduct and operate relays SDA and SDB.

Closure of contacts SDA1 to SDA4 and SDB1 to SDB3 extend the leads 114 to 119 and 121 to 123 to relays DW to DZ and DA to DC while contacts SDB4 cause the "proceed to send" signal again to be sent back to the sender 5.

Upon the second decimal digit being signalled forward, one of the relays DW to DZ and one of the relays DA to DC are operated and operation of these relays in turn causes operation of one of ten relays NA to NJ to characterise the second decimal digit. At this time a relay HD is operated and performs essentially the same functions as the relay HC after the first digit had been received. In particular the "digit acknowledge" signal is again sent back to the sender 5.

It will be appreciated that the first two decimal digits that have been signalled forward are stored at this time by operation of one of the relays MA to MJ and one of the relays NA to NJ. Contacts of these relays (only the contacts MBI and NG1 being shown by way of example) are connected so voltage is applied to one of a group of one hundred leads (of which only the lead 136 is shown). These leads are combined into ten leads 137 which is marked by the application of voltage to characterise the level of the output path to which connection is required. Thus as far as each of the group selector units 1A to 1F (FIGURE 1) is concerned, the leads 136 corresponding to the following decimal numbers are combined in this translation network for successive output levels: 23, 01 to 06, 07 to 12, 13 to 18, 19 to 22 and 25, 27 to 32, 33 to 38, 39 to 44 and 45 to 68.

Similarly in each of the group selector units 1G and 1H, the leads 136 are combined as follows: 24, 45 to 50, 51 to 56, 57 to 62 and 63 to 68.

It will be appreciated that the group selector units 1G and 1H and the final selector units 2A to 2H operate in essentially the same manner as the group selector units 1A to 1F in response to signals passed thereto from the proceeding selector unit. In fact the final selector units 2A to 2H are the same as the group selector units described above in detail with the following modifications:

(1) The circuit 138 in FIGURE 13 is replaced by the circuit of FIGURE 14. This enables −50 volts to be supplied to both the A and B speech wires for the purpose of providing the unit identifying signal sent back to the sender 5.

(2) Relays SDA, SDB, HC, BC, CW to CZ, CA to CW and NA to NJ are duplicated with their associated circuits to enable a third decimal digit to be received.

(3) The translation network provided by the contacts MA1 to MJ1, NA1 to NJ1 is extended to include the contacts of the corresponding relays mentioned at (2) above to enable six hundred leads 136 to be marked.

(4) The leads 136 are not combined since each of these leads is associated with a unique subscriber and the application of voltage thereto signifies to the switching unit of a final selector unit that connection is to be made thereby to a particular subscriber.

It will be appreciated that the form of exchange described above by way of example may be extended by providing additional group selector units in both the main rank and in the additional rank together with additional final selector units. As far as the group selector units in the main rank are concerned, the output paths in corresponding levels may be multiplied together. An example of a typical extension is shown by the broken lines in FIGURE 1. The group selector units in the additional ranks may all have their output paths in corresponding levels connected by a graded multiple although alternatively only some of these levels may be so multipled over all the units of this rank, the output paths of corresponding other levels of some only of the group selector units in this rank being connected by way of a graded multiple to the appropriate final selector units.

The embodiment of the invention described above by way of example is only concerned with the final stages of numerical switching. The invention may, however, be applied more generally to automatic switching systems in which case the translations effected by the networks associated with the selector units corresponding to the group selector units in the main and additional ranks may be arranged to effect a required translation for the purpose of routing to the exchange of a called subscriber. Furthermore these selector units may be provided with relays that are each responsive to all the output paths of an associated level being busy. When such a relay is operated the contacts thereof modify the translation network so that another call requiring access to an output path in the busy level is then routed via an output path in another level to a further selector unit which is identical to those previously considered. This further switching unit responds in exactly the same manner as the other units and its associated translation network is arranged so that when the appropriate information is repeated thereto from the main register the further switching unit operates to extend the calling path over an alternative route that is suitable for setting up connection to the called subscribers exchange.

We claim:

1. A telecommunications switching system comprising:

(A) a plurality of first selector units each having a plurality of input paths and a plurality of output paths which are arranged in a plurality of levels each consisting of a plurality of said output paths, each first selector unit being capable of providing connections between any one of its input paths and an output path of any selected level thereof, (B) a plurality of second selector units which are more numerous than the number of output path levels of the first selector units and which each have a plurality of input paths and a plurality of output paths, each second selector unit being capable of providing connections between any one of its input paths and any one of its output paths, (C) multiple circuit means connecting together the output paths of some of the corresponding output path levels of all the first selector units to the input paths of some of the second selector units, (D) an additional selector unit having a plurality of input paths and a plurality of output paths which are arranged in a plurality of levels each consisting of a plurality of those output paths, this additional selector unit being capable of providing connections between any one of its input paths and an output path of any selected level thereof, (E) multiple circuit means connecting together the output paths of at least one output path level of all the first selector units to input paths of the additional selector unit, (F) circuit means connecting the output paths of the additional selector unit to input paths of second selector units that are not directly connected as aforesaid to the first selector units, (G) main register means, (H) circuit means temporarily to connect the main register means to any one of the input paths of the first selector units when a connection is to be set up through the switching system so that the main register means may store a plurality of decimal digits characterizing the output path of the second selector units to which connection is required, (I) selector unit identifying means which is associated with the main register means and which is responsive to information signalled back thereto identifying the type of selector unit next to be operated in setting up a connection through the system, (J) register signalling means associated with the main register means to signal forward information as to only those digits stored by the main register means that may be acted on by the type of selector unit identified by the last-mentioned means, (K) selector unit signalling means which is associated with each of the second and additional selector units and which is responsive to access being gained to one of those units as a connection through the system is being set up to signal back to the selector unit identifying means information as to the type of that unit, and (L) additional registers which are associated individually one with each of the first and additional selector units to store the digits signalled thereto by the register signalling means that characterize the level of an output path of that selector unit to which connection is required.

2. A telecommunications switching system according to claim 1 wherein the second selector units constitute final selector units of the switching system.

3. A telecommunications switching system according to claim 1 wherein said information as to the type of selector unit to which connection is established is signalled back by said selector unit signalling means as a characteristic combination of voltages on the speech wires of the relevant paths.

4. A telecommunications switching system according to claim 1 wherein each decimal digit that is signalled forward by said register signalling means is signalled as a characteristic combination of voltages on the speech wires of the relevant paths.

5. A telecommunications switching system according to claim 1 wherein the main register means is adapted to store four decimal digits and the first selector units and the additional selector units are each arranged to be controlled by the first two of those digits while the second selector units are each arranged to be controlled by the last three of those digits.

6. A telecommunications switching system comprising:

(A) a plurality of first selector units each having a plurality of input paths and a plurality of output paths which are arranged in a plurality of levels each consisting of a plurality of said output paths, each first selector unit being capable of providing connections between any one of its input paths and an output path of any selected level thereof, (B) a plurality of second selector units which are more numerous than the number of output path levels of the first selector units and which each have a plurality of input paths and a plurality of output paths, each second selector unit being capable of providing connections between any one of its input paths and any one of its output paths, (C) multiple circuit means connecting together the output paths of some of the corresponding output path levels of all the first selector units to the input paths of some of the second selector units, (D) a plurality of additional selector units each having a plurality of input paths and a plurality of output paths which are arranged in a plurality of levels each consisting of a plurality of those output paths, these additional selector units each being capable of providing connections between any one of its input paths and an output path of any selected level thereof, (E) multiple circuit means connecting together the output paths of at least one output path level of all the first selector units that are not directly connected to second selector units as aforesaid to input paths of the additional selector units, (F) multiple circuit means connecting together the output paths of corresponding output path levels of the additional selector units that are not directly connected to second selector units as aforesaid to input paths of second selector units that are not directly connected as aforesaid to the first selector units, (G) main register means, (H) circuit means temporarily to connect the main register means to any one of the input paths of the first selector units when a connection is to be set up through the switching system so that the main register means may store a plurality of decimal digits characterizing the output path of the second selector units to which connection is required, (I) selector unit identifying means which is associated with the main register means and which is responsive to infomation signalled back thereto identifying the type of selector unit next to be operated in setting up a connection through the system, (J) register signalling means associated with the main register means to signal forward information as to only those digits stored by the main register means that may be acted on by the type of selector unit identified by the last-mentioned means, (K) selector unit signalling means which is associated with each of the second and additional selector units and which is responsive to access being gained to one of those units as a connection through the system is being set up to signal back to the selector unit identifying means information as to the type of that unit, and (L) additional registers which are associated individually one with each of the first and additional selector units to store the digits signalled thereto by the register signalling means that characterize the level of an output path of that selector unit to which connection is required.

References Cited

UNITED STATES PATENTS

| | | | |
|---|---|---|---|
| 2,431,313 | 11/1947 | den Hertog | 179—18 |
| 2.741.664 | 4/1956 | Oberman | 179—18 |

WILLIAM C. COOPER, Primary Examiner